United States Patent
Jones et al.

(10) Patent No.: US 9,132,301 B2
(45) Date of Patent: Sep. 15, 2015

(54) SPEED RESPONSIVE ENGAGEMENT DEVICE

(75) Inventors: Karl Jones, Wilshire (GB); David Crowley, Wiltshire (GB)

(73) Assignee: LATCHWAYS PLC (GB)

( * ) Notice: Subject to any disclaimer, the term of this patent is extended or adjusted under 35 U.S.C. 154(b) by 1629 days.

(21) Appl. No.: 12/373,277

(22) PCT Filed: Jul. 13, 2007

(86) PCT No.: PCT/GB2007/002650
§ 371 (c)(1),
(2), (4) Date: Dec. 2, 2010

(87) PCT Pub. No.: WO2008/007119
PCT Pub. Date: Jan. 17, 2008

(65) Prior Publication Data

US 2011/0088976 A1    Apr. 21, 2011

(30) Foreign Application Priority Data

Jul. 14, 2006  (GB) .................................. 0614064.4

(51) Int. Cl.
*A62B 35/00* (2006.01)
*F16D 59/00* (2006.01)
*A62B 1/10* (2006.01)

(52) U.S. Cl.
CPC ............ *A62B 35/0093* (2013.01); *F16D 59/00* (2013.01); *A62B 1/10* (2013.01)

(58) Field of Classification Search
CPC ........ B66D 1/06; A62B 35/0093; A62B 1/08; A62B 1/10; F16D 59/00
USPC ........... 188/82.7, 72.7, 73.1; 182/5, 231, 234, 182/239; 192/46, 107 T, 108
See application file for complete search history.

(56) References Cited

U.S. PATENT DOCUMENTS

| | | | | |
|---|---|---|---|---|
| 490,222 A | * | 1/1893 | Arnold | .......................... 182/237 |
| 1,256,016 A | * | 2/1918 | Henderson | ................... 191/12.4 |
| 2,747,709 A | * | 5/1956 | Bennett | ...................... 192/223.1 |
| 2,776,815 A | * | 1/1957 | Sheard | ....................... 242/157.1 |

(Continued)

FOREIGN PATENT DOCUMENTS

FR    1270109 A    8/1961

OTHER PUBLICATIONS

European Patent Office, "International Search Report," Sep. 21, 2007, p. 1-2.

*Primary Examiner* — Daniel Cahn
(74) *Attorney, Agent, or Firm* — Fulwider Patton LLP

(57) ABSTRACT

A speed responsive engagement device having a rotating wheel having a plurality of outwardly projecting spaced apart teeth with each pair of adjacent teeth being separated by a circumferential surface with a constant radius and a pawl arranged for pivotal movement between an unengaged position and an engaged position in which the pawl engages one of the teeth and a circumferential surface and a resilient means arranged to urge the pawl towards the engaged position when the pawl is not in contact with the circumferential surface. When the wheel rotates each tooth contacts the pawl, generating an oscillating movement of the pawl with an amplitude dependent on the speed of the rotation. When the speed of rotation reaches a predetermined value the oscillating movement brings the pawl into the engaged position, preventing further rotation of the wheel in the first direction.

10 Claims, 4 Drawing Sheets

(56) References Cited

U.S. PATENT DOCUMENTS

| | | | |
|---|---|---|---|
| 2,976,959 A * | 3/1961 | Husted | 188/82.7 |
| 3,590,656 A * | 7/1971 | Lloyd, Jr. | 74/575 |
| 3,760,910 A * | 9/1973 | Koshihara | 188/180 |
| 4,511,123 A | 4/1985 | Ostrobrod | |
| 4,589,523 A * | 5/1986 | Olson et al. | 182/234 |
| 5,343,976 A * | 9/1994 | Ostrobrod | 182/4 |
| 6,279,682 B1 * | 8/2001 | Feathers | 182/239 |
| 7,210,645 B2 * | 5/2007 | Paterson et al. | 242/383.4 |
| 7,721,378 B2 * | 5/2010 | Ostrobrod | 15/160 |
| 7,870,934 B2 * | 1/2011 | Ecker | 182/239 |
| 2006/0054730 A1 | 3/2006 | Paterson | |

* cited by examiner

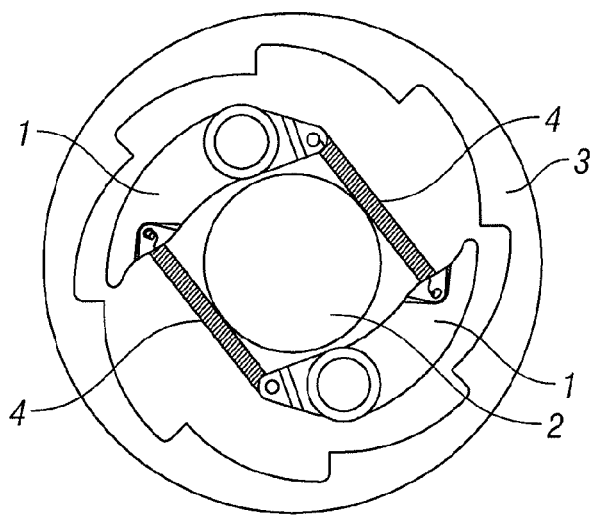
FIG. 1 - PRIOR ART
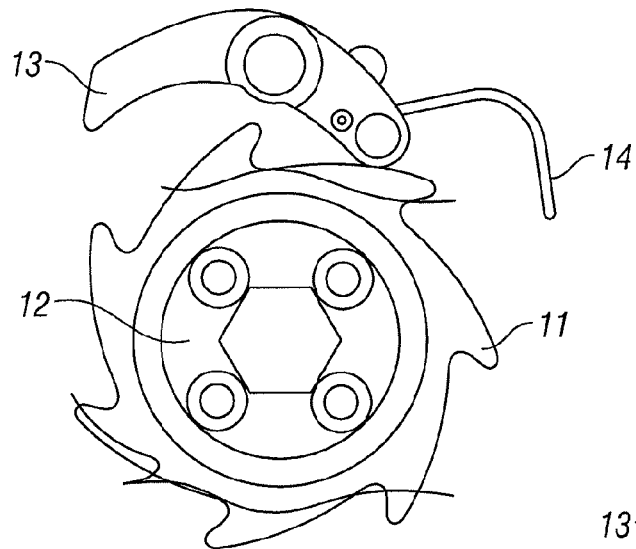
FIG. 2A - PRIOR ART
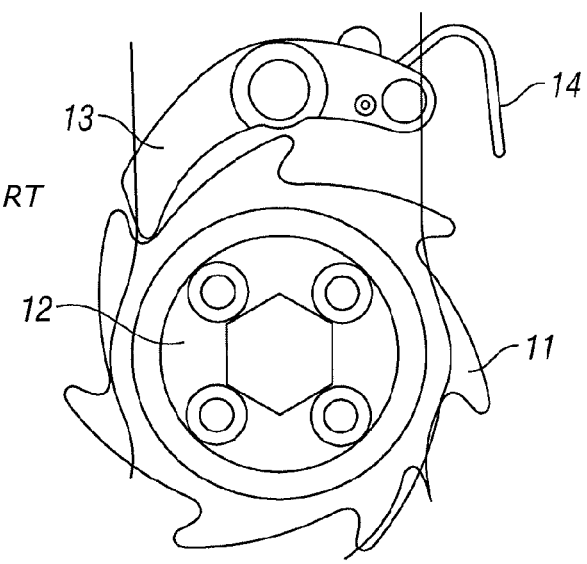
FIG. 2B - PRIOR ART

SPEED RESPONSIVE ENGAGEMENT DEVICE

RELATED APPLICATIONS

This is a U.S. national phase application of PCT/GB 2007/002650, filed Jul. 13, 2007, 2006, which claims priority to United Kingdom Application No. 0614064.4, filed Jul. 14, 2006.

BACKGROUND

This invention relates to a speed responsive engagement device, and in particularly to a speed responsive engagement device for use in fall arrest apparatus.

Speed responsive engagement devices for use with rotating parts to selectively engage the rotating parts to other components if the speed of rotation of the parts exceeds a threshold value are well known.

There are two main types of such speed responsive engagement devices. A first type of speed responsive engagement device are devices of the centrifugal clutch type. A schematic view of such a centrifugal clutch is shown in FIG. 1. The centrifugal clutch has pawls 1 rotating within a fixed circular ratchet 3 and mounted on a rotating component 2. The pawls 1 are arranged for pivotal movement so that they can move between an inner disengaged position where the pawls 1 are not engaged with the ratchet 3 and the component 2 can rotate freely, and an outer engaged position where the pawls 1 are engaged with the ratchet 3 so that rotation of the component 2 relative to the ratchet 3 is prevented. The pawls 1 are biased inwardly towards the unengaged position, generally by resilient means such as springs 4, and are arranged to be biased outwardly by centrifugal forces as the component 2 rotates. By appropriate selection of dimensions and components the centrifugal clutch can be arranged to engage the pawls 1 to the ratchet 3 at a desired rotational speed of the component 2.

A second type of speed responsive engagement device are devices of the rocking pawl type. A schematic view of such a rocking pawl device is shown in FIGS. 2A and 2B. The rocking pawl device has a ratchet mechanism in the form of an outwardly facing ratchet wheel 11 attached to the rotating component 12 and a pawl 13 contacting the ratchet wheel 11. The pawl 13 is able to pivot between a first unengaged position shown in FIG. 2a in which the pawl 13 is not engaged with the ratchet wheel 11 so that the component 12 is able to rotate freely, and a second engaged position shown in FIG. 2b where the pawl 13 is engaged to the ratchet wheel 11 preventing rotation of the component 12 relative to the structure to which the pawl 13 is attached. The pawl 13 is biased by resilient means 14 towards the first unengaged position. As the component 12 rotates and the ratchet wheel 11 rotates relative to the pawl 13, each tooth of the ratchet wheel 11 in turn strikes a first end of the pawl 13 and pushes it outwardly away from the ratchet wheel 11 so that the pawl 13 pivots towards the engaged position. The pawl 13 is resiliently biased towards the first unengaged position, and as a result this outward pushing of the pawl 13 by the ratchet wheel teeth results in an oscillating movement of the pawl 13 from the unengaged position towards the engaged position and back towards the unengaged position. As the speed of rotation of the component 12 and the ratchet wheel 11 increases the amplitude of the oscillation of the pawl 13 increases until the amplitude of the oscillation is large enough to bring the pawl 13 into the engaged position. The pawl 13 then engages with the ratchet wheel 11 and rotation of the component 12 relative to the pawl 13 and structure to which is attached is prevented.

Again, the dimensions of the components can be selected to set the threshold rotational speed at which the pawl 13 is driven into engagement with the ratchet wheel 11 to a desired value.

The speed sensitive engagement means of both of these known types are used in fall arrest systems of the type where personnel working at height are attached to a safety line wound around a drum. The drum has an automatic rewinding mechanism and a speed sensitive attachment mechanism of the type disclosed above, which responds to the rotation of the drum at a speed above a predetermined threshold by locking the drum against further rotation relative to the drum support or other fixed structure.

In use, fall arrest systems of this type allow personnel to move freely around a working area including moving upwardly and downwardly in the area, with the safety line being automatically paid out from and wound onto the drum under the control of the automatic rewinding mechanism as necessary to allow the personnel movement and keep the safety line taut. When a personnel fall occurs, the safety line is pulled out at a much greater speed then is necessary for normal movement and the speed of rotation of the drum rises to the threshold value of the speed sensitive engagement means, which locks the drum against further rotation and so arrests the fall.

In practice it has been found that there is a problem with fall arrest systems of both of these known types that after a fall has been arrested the speed sensitive engagement means can release the engagement allowing the personnel to again start to fall until the speed of rotation of the drum again reaches the threshold value and the fall is again arrested.

It has been found that it is possible for this cycle to be repeated so that personnel drop in a series of short falls until they reach the ground or some other supporting surface.

This problem is generally referred to as bounce.

Bounce is dangerous and presents a serious problem for a number of reasons. Firstly, the personnel may be injured by impact with other objects during the multiple falls. Further, in general fall arrest systems are designed so that users undergoing a fall arrest event are only subject to a safe level of force. However, these safe levels are calculated on the assumption of single fall event. Even when a single application of a fall arrest force is safe, repeated application of the same force to a user can result in injury. This problem is made more severe by the fact that many fall arrest systems include single use energy absorbing or shock limiting devices so that successive falls and arrests resulting from bounce may result in personnel being subject to higher than expected levels of force because the capacity of the single use energy absorbing or shock limiting devices in the system has been used up. Further, the repeated fall and arrest loads on the fall arrest system due to bounce can result in failure or damage of components of the fall arrest system or the supporting structure to which it is attached. Finally, where bounce results in personnel descending all the way to the ground or other supporting structure in a series of short falls the final impact with the ground or other support structure may be at a sufficiently high speed to cause injury.

The present invention was made in any attempt to provide a speed sensitive engagement device overcoming this problem.

SUMMARY OF THE INVENTION

In a first aspect, this invention provides a speed responsive engagement device comprising: a wheel arranged for rotation about a first axis and having a plurality of outwardly projecting spaced apart teeth with each pair of adjacent teeth being separated by a circumferential surface with a constant radius; a pawl arranged for pivotal movement about a second axis between a first unengaged position and a second engaged position in which the pawl engages one of said teeth and contacts a circumferential surface; and a resilient means arranged to urge said pawl towards the first position when the pawl is not in contact with a circumferential surface; such that when the wheel rotates in a first direction each tooth contacts the pawl, generating an oscillating movement of the pawl from the first position towards the second position with an amplitude dependent on the speed of the rotation, and when the speed of rotation reaches a predetermined value the oscillating movement brings the pawl into the engaged position, preventing further rotation of the wheel in said first direction.

This invention is based upon a realisation that the problem of bounce is caused by the fact that when the known speed sensitive engagement means are in the engaged state the pawls are biased into a unengaged condition and are only kept in the engaged condition by the pawls being held against the biasing by the ratchet teeth. When these engagement means are used in a fall arrest system and a fall arrest occurs there is a stretching or tensioning of the safety line followed by a momentary reduction in tension to zero as the arrested person bounces at the end of the safety line. During this momentary reduction in tension the automatic rewinding mechanism causes the drum to rotate slightly in the rewinding direction, releasing the pawls from engagement with the ratchet teeth. The biasing then causes the pawls to move to the unengaged position, releasing the drum and allowing the personnel to start falling again.

This will not occur in a speed sensitive engagement means according to the present invention because the pawls are not biased when they are in the engaged state contacting the circumferential surface and the small rotation of the drum in the rewinding direction will not be sufficient to move the pawls to the end of the circumferential surface and cause movement of the pawl from the engaged state to the unengaged state.

BRIEF DESCRIPTION OF THE DRAWINGS

Preferred embodiments of the invention will now be described by way of example only with reference to the accompanying diagrammatic figures, in which:

FIG. 1 shows a first known type of speed responsive engagement device;

FIGS. 2a and 2b show a second known type of speed responsive engagement device;

DETAILED DESCRIPTION OF THE PREFERRED EMBODIMENTS

Figure 3:
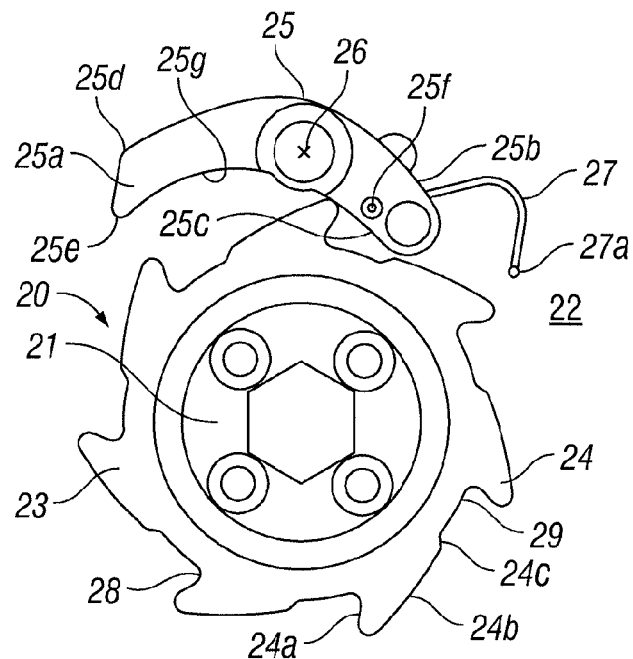
FIG. 3 shows a view of operative parts of a speed responsive engagement device according to the present invention in a first disengaged position.

Referring to FIGS. 3 to 6 schematic diagrams showing the operating parts of a speed responsive engagement device 20 according to the present invention are shown. The device 20 is responsive to the speed of rotation of a shaft 21 relative to a fixed support structure 22 in a clockwise direction.

A ratchet wheel 23 is mounted on the shaft 21. The ratchet wheel 23 comprises a circumferential surface 29 having a constant radius 43 (FIG. 6) and a plurality of identical teeth 24 arranged evenly spaced around and projecting outwardly from the circumferential surface 29. Each tooth 24 has an undercut inner front sloping surface 24a and an outer rear sloping surface 24b. The teeth 24 are shaped and spaced to leave a section of the circumferential surface 29 of the wheel 23 between adjacent teeth 24. The outer rear sloping surface 24b of each tooth 24 ends in a step 24c down to the circumferential surface 29. The inner front sloping surface 24a of each tooth 24 is arranged to define a recess 28 between the front surface 24a and the circumferential surface 29 of the wheel 23.

A pawl 25 is mounted for pivotal movement about an axis 26 on the supporting structure 22 adjacent to the ratchet wheel 23. The pawl 25 can move between a first, disengaged, position, shown in FIG. 3, in which the ratchet wheel 23 and shaft 21 are able to rotate relative to the fixed structure 22 and a second, engaged, position, shown FIG. 4, where the pawl 25 is engaged with the ratchet wheel 23 so that rotation of the ratchet wheel 23 and shaft 21 relative to the support structure 22 in a clockwise direction is prevented.

The engagement between the pawl 25 and ratchet wheel 23 only prevents rotation of the shaft 21 in one direction, clockwise in the figures. Similarly to the prior art devices rotation of the shaft 21 in the opposite direction, anticlockwise in the illustrated embodiment, releases the engagement between pawl 25 and ratchet wheel 23. The speed responsive engagement device according to the present invention could be made opposite handed to be responsive to rotation in an anticlockwise direction.

The pawl 25 is arranged for pivoting arrangement around the axis 26 and has first and second ends 25a and 25b arranged on opposite sides of the axis 26. The first end 25a of the pawl 25 is shaped to be able to engage with a tooth 24 of the ratchet wheel 23 when the pawl 25 is in the engaged position, as shown in FIG. 4. The second end 25b of the pawl 25 has a smoothly curved concave inner surface 25c so that when the pawl 25 is in the disengaged position shown in FIG. 3 and the ratchet wheel 23 rotates clockwise the second end 25b of the pawl is contacted by a tip of each tooth 24 of the ratchet wheel 23 so that as the ratchet wheel 23 rotates the second end 25b of the pawl 25 is urged outwardly. A leafspring 27 connects a point 27a on the fixed structure 22 to a point 25f on the pawl 25. The leafspring 27 is held in compression so that it tends to urge the pawl 25 to rotate clockwise towards the unengaged position shown in FIG. 3. The clockwise rotation of the pawl 25 driven by the leafspring 27 is limited by the second end 25b of the pawl 25 contacting a tooth 24 of the ratchet wheel 23.

Accordingly, when the shaft 21 and the attached ratchet wheel 23 rotates clockwise, each tooth 24 of the ratchet wheel 23 in turn contacts the second end 25b of the pawl 25 and urges the second end 25b of the pawl 25 outward against the bias of the leaf spring 27. As a result, the pawl 25 follows an oscillating movement out of the unengaged position shown in FIG. 3 towards the engaged position shown in FIG. 4 and then back to the unengaged position shown in FIG. 3.

The higher the speed of rotation of the shaft 21 and ratchet wheel 23, the greater the amplitude of the oscillation of the pawl 25 will be. When the speed of clockwise rotation of the shaft 21 and ratchet wheel 23 rises to a threshold speed the amplitude of the oscillation of the pawl 25 will be sufficient to bring the first end 25a of the pawl 25 into contact with a tooth 24 of the ratchet wheel 23.

Figure 4:
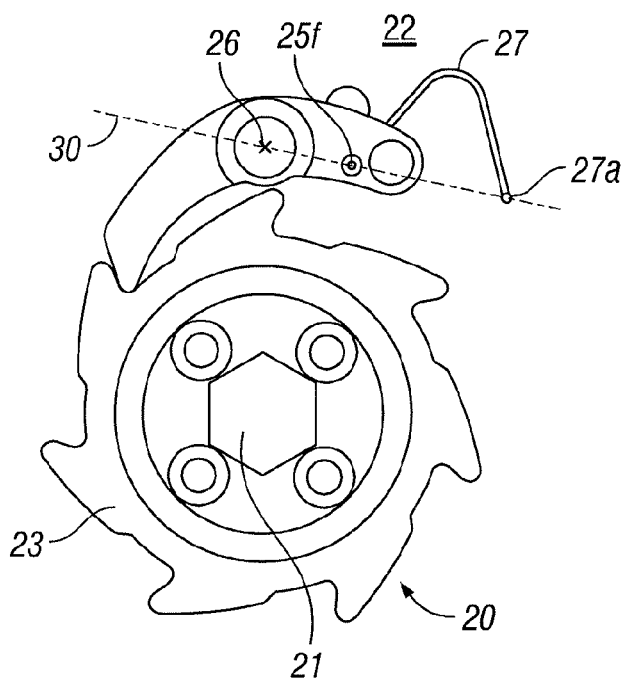
FIG. 4 shows a view of the speed responsive engagement device of FIG. 3 in a second engaged position.

When the pawl 25 is in the disengaged position shown in FIG. 3 and the ratchet wheel 23 rotates anticlockwise the second end 25b of the pawl 25 is contacted by the outer surface of each tooth 24 of the ratchet wheel 23 so that as the ratchet wheel 23 rotates the second end 25b of the pawl 25 is urged outward against the bias of the leaf spring 27. As a result, the pawl 25 follows an oscillating movement out of the unengaged position shown in FIG. 3 towards the engaged position shown in FIG. 4 and then back to the unengaged position shown in FIG. 3. The first end 25a of the pawl 25 has a smoothly curved concave inner surface 25g so that when the pawl 25 has moved towards the engaged position shown in FIG. 4, as the ratchet wheel 23 rotates anticlockwise the first end 25a of the pawl is contacted by a tip of each tooth 24 of the ratchet wheel 23 so that as the ratchet wheel 23 rotates the first end 25a of the pawl 25 is urged outwardly, urging the pawl 25 back towards the unengaged position shown in FIG. 3. It is not possible for the pawl 25 to engage with the teeth 24 when the ratchet wheel 23 is rotating anticlockwise.

As explained above, rotation of the shaft 21 and ratchet wheel 23 in either direction causes contact of each tooth 24 in turn with the pawl 25. These contacts produce a clicking sound which provides an audible indiction of proper operation of the engagement device 20 to a user.

The first end 25a of the pawl 25 has an outer end surface 25d shaped to cooperate with the front surface 24a of the tooth 24 so that when the outer end surface 25d contacts front surface 24a of a tooth 24 the first end 25a of the pawl 24 is urged into the recess 28. As a result, when the speed of rotation of the shaft 21 and ratchet wheel 23 rises to the threshold value the pawl 25 will be urged into the engaged position shown in FIG. 4 where a tip 25e of the first end 25a of the pawl 25 is inserted as far as possible into the recess 28 and contacts the front surface 24a of the tooth 24 and the circumferential surface 29 of the wheel 23, which extends between the teeth 24. This engagement will lock the ratchet wheel 23 against the pawl 25 and stop further clockwise rotation of the shaft 21 and ratchet wheel 23 relative to the fixed structure 22.

The pawl 25 is arranged so that when the tip 25e of the pawl 25 is in contact with the circumferential surface 29, the axis 26 and the attachment points 25f and 17a of the leaf spring all lie on a straight line 30, as can be seen in FIG. 4. As a result of this geometry, the leaf spring 27 will be in a neutral position in which it does not apply any couple to the pawl 25 when the tip 25e is in contact with the circumferential surface 29.

Figure 5:
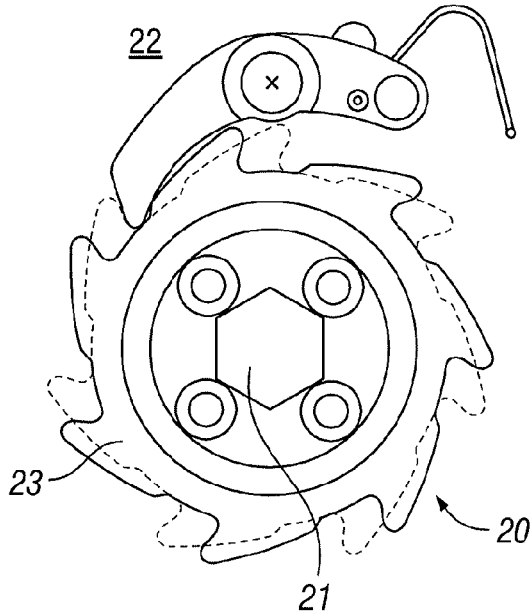
FIG. 5 shows the speed responsive engagement device of FIG. 3 in a further engaged position which may be encountered during use.

Accordingly, when the pawl 25 is the engaged position shown in FIG. 4 and the wheel 23 is rotated anticlockwise by a small amount, the pawl 25 will not rotate about the axis 26 because no couple is acting on it and will remain in contact with the circumferential surface 29. As the anticlockwise rotation of the wheel 23 continues the position shown in FIG. 5 will be reached where the pawl 25 is in contact with the step 24c of the adjacent tooth 24. For comparison, FIG. 5 shows the wheel 23 in the position of FIG. 4 in dashed lines. Further anticlockwise rotation of the wheel 23 beyond this contact position will cause the pawl 25 to be urged clockwise by the step 24c, moving the second end 25b of the pawl 25 towards the wheel 23. As the pawl 25 moves clockwise the leafspring 27 will move out of the neutral position and will urge the pawl 25 clockwise towards the unengaged position. Alternatively, clockwise rotation of the wheel 23 from the contact position shown in FIG. 5 will return the pawl 25 to the engaged position of FIG. 4.

Thus, the length of the circumferential surface 29 between adjacent teeth 24 sets a threshold amount of counter rotation (anticlockwise in the embodiment) required to disengage the pawl 23 from a tooth 24. Counter rotation by less than this threshold amount will not disengage the pawl 23 from a tooth 24.

As a result, when the speed responsive engagement device 20 of the present invention is used in a fall arrest system, if a fall causes a safety line to be unwound from a drum at or above the threshold speed the pawl 25 will engage with a tooth 24 of the wheel 23, stopping the rotation of the drum and arresting the fall. If the tension in the safety line then temporarily drops to a low value or zero because of the arrested person bouncing on the end of the safety line, or other transient effects, the resulting small anticlockwise rotation of the wheel 23 produced by the automatic rewinding mechanism will not disengage the pawl 23 from the tooth 24 and allow the person to resume their fall. Accordingly, the problem of bounce is overcome.

In any specific fall arrest system the device 20 can be arranged so that the length of the circumferential surface 29 between adjacent teeth 24 is sufficient to allow the amount of counter rotation which occurs during a fall arrest event to be carried out without disengaging the device 20.

Figure 7:
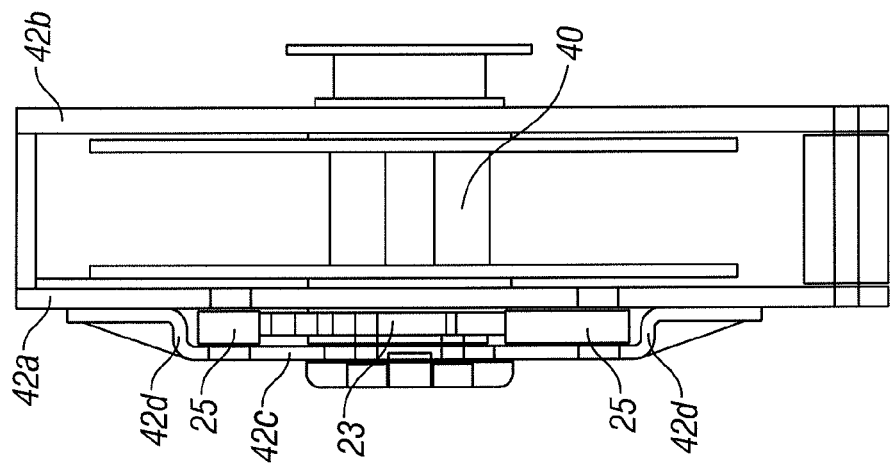
FIG. 7 shows a side view of the speed responsive engagement device of FIG. 6.
Figure 6:
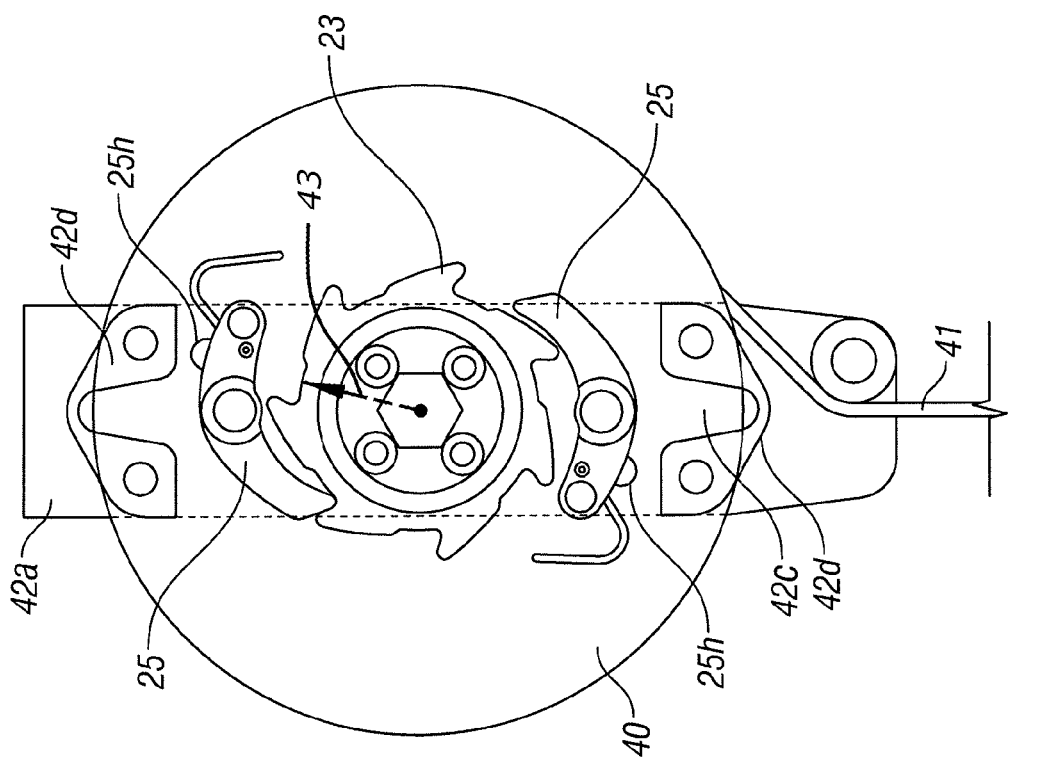
FIG. 6 shows a view of a complete speed responsive engagement device of FIG. 3 in a second engaged position.
Figure 8:
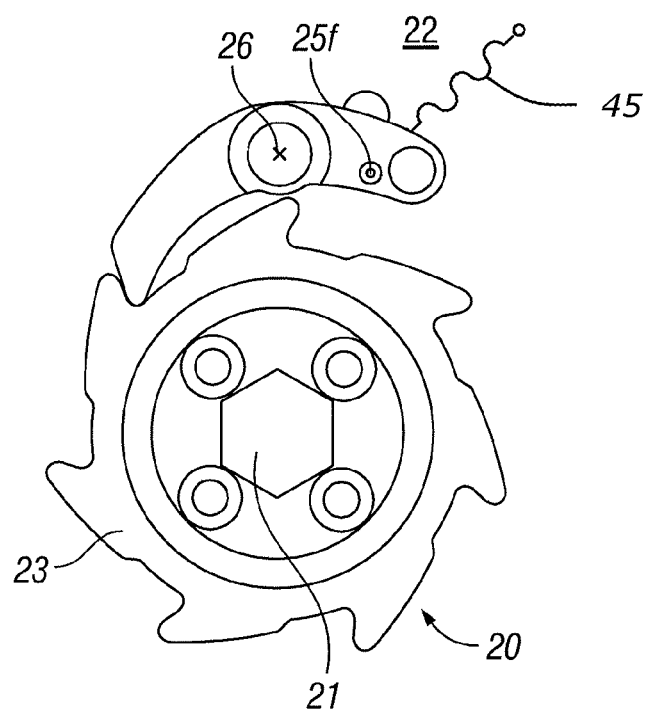

FIGS. 6 and 7 show a complete speed sensitive device 20 according to the invention for use in a fall arrest system.

The speed sensitive device 20 is arranged to control rotation of a drum 40 around which a safety line 41 is wound. A wheel 23 is attached to the drum 40 and a pair of pawls 25 are arranged at diametrically opposed positions on either side of the wheel 23. A pair of pawls 25 are used for redundancy to improve safety. The pawls 25 are each capable of independently stopping rotation of the wheel 23 and drum 40.

The drum 40 is mounted for rotation between a pair of sideplates 42a and 42b. The speed sensitive device 20 is located between one of the sideplates 42a and a further sideplate 42c arranged parallel to the sideplate 42a and secured to the sideplate 42a by a pair of endwalls 42d. The pawls 25 are mounted for pivotal movement between the sideplates 42a and 42c. The mounting of the pawls 25 between the two sideplates 42a and 42c helps to stabilise the pawls 25.

Each pawl 25 has a projection 25h which extends from the back surface of the second end 25b of the pawl 25, that is, in a direction away from the wheel 23. In the event that the engaged device 20 is overloaded sufficiently to break the pivotal connection between a pawl 25 and the sideplates 42a and 42c, the projection 25h of the pawl 25 will contact one of the endwalls 42d so that the pawl 25 will become wedged between the wheel 23 and the endwall 42d, preventing the wheel 23 being released from engagement.

As is shown best in FIG. 3, the pawl 25 and wheel 23 are shaped so that the second end 25b of the pawl 25 cannot contact the surface 29. This is preferred, but is not essential.

In the descriptions of the preferred embodiment set out above the use of a safety line wound around the drum is referred to. This is not essential and other forms of elongate support such as a cable or a webbing strap could be used instead.

The above description refers to fall arrest systems for arresting a fall by a user. This is the most common application of a fall arrest system. However, the present invention can also be used in a height safety system to arrest falls by objects, for example, equipment being used or moved at height.

The embodiments discussed above are examples only and are not exhaustive. The skilled person will be able to envisage further alternatives within the scope of the present invention as defined by the attached claims.

The invention is:

1. A speed responsive engagement device comprising:
a wheel configured to rotate about a first axis, the wheel having a plurality of outwardly projecting spaced apart teeth forming pairs of adjacent teeth, wherein each tooth of each of the pairs of adjacent teeth are separated by a circumferential surface of the wheel respectively, each said circumferential surface having a length extending between each said tooth respectively, each point along each said length collectively defining a single circle which has a constant radius from a center of the wheel;
a pawl configured to pivot about a second axis between a first unengaged position and a second engaged position, the second engaged position being when the pawl is in direct contact with one of the circumferential surfaces of the wheel; and
a resilient element configured to urge said pawl towards the first unengaged position, the first unengaged position being when the pawl is not in contact with one of the circumferential surfaces of the wheel;
the speed responsive engagement device configured such that when the wheel rotates in a first direction about said first axis at a speed of rotation below a predetermined threshold value, each tooth contacts the pawl in turn to pivot the pawl from the first unengaged position towards the second engaged position, generating an oscillating movement of the pawl about the second axis with an amplitude dependent on the speed of rotation of the wheel, so that as a direct result of the speed of rotation of the wheel reaching the predetermined threshold value, the amplitude from the oscillating movement becomes large enough to cause the pawl to move into the second engaged position and engage one of said teeth to prevent further rotation of the wheel in said first direction;
wherein the resilient element is configured not to urge said pawl towards the first unengaged position when said pawl is in the second engaged position so that the pawl stays in the second engaged position for a threshold amount of distance upon counter rotation of the wheel in a second direction opposite of the first direction, each said length respectively defines the threshold amount of distance.

2. The device according to claim 1, and further comprising a projection at an end of each circumferential surface such that when the pawl is in the engaged position and the wheel counter rotates the projection moves the pawl out of the engaged position.

3. The device according to claim 2, in which each projection is formed by a part of a tooth.

4. The device according to claim 2, in which each projection is a step.

5. The device according to claim 1, in which the resilient element is connected to a first point on the pawl and a second fixed point, arranged so that when the pawl is in contact with one of the circumferential surfaces, the first point, the second point and the second axis all lie in a straight line.

6. The device according to claim 5, in which the resilient element is a leaf spring.

7. The device according to claim 1, in which each tooth has an undercut surface arranged to urge the pawl into the engaged position.

8. The device according to claim 1, in which when the wheel rotates in either direction each tooth contacts the pawl in turn generating an audible sound.

9. The device according to claim 1, further comprising
at least one or more additional pawls, with each of the at least one or more additional pawls arranged for pivotal movement about an additional axis associated with each of the at least one or more additional pawls between another unengaged position and another engaged position, said another engaged position being when each of the at least one or more additional pawls directly contact one of said circumferential surfaces such that each of the at least one or more additional pawls and said pawl directly contact separate ones of said circumferential surfaces respectively when in the engaged positions; and
an additional resilient element associated with each of the at least one or more additional pawls, the additional resilient element configured to urge each of said at least one or more additional pawls towards said another unengaged position when each of the at least one or more additional pawls are not in contact with one of the circumferential surfaces of the wheel.

10. The device according to claim 1, further comprising an elongate support wound around a drum, the speed responsive engagement device being arranged to respond to rotation of the drum in a direction unwinding the elongate support.

* * * * *